United States Patent [19]

Duncan et al.

[11] Patent Number: 4,971,750
[45] Date of Patent: Nov. 20, 1990

[54] END STOP FOR WELDING SEALING PLUGS OF NUCLEAR FUEL RODS

[75] Inventors: Robert Duncan, Fork; David A. Boatwright, Columbia, both of S.C.

[73] Assignee: Westinghouse Electric Corp., Pittsburgh, Pa.

[21] Appl. No.: 373,076

[22] Filed: Jun. 29, 1989

[51] Int. Cl.⁵ .............................................. G21C 21/00
[52] U.S. Cl. ..................................... 376/261; 376/451; 219/60 R
[58] Field of Search ........................ 376/260, 261, 451; 219/60 A, 60 R, 61, 125.11, 136, 137 R, 72, 74

[56] References Cited

U.S. PATENT DOCUMENTS

| | | | |
|---|---|---|---|
| 3,064,381 | 11/1962 | Vilbajo | 42/1 |
| 3,530,762 | 9/1970 | Batie et al. | 89/7 |
| 3,725,635 | 4/1973 | Fink et al. | 219/137 R |
| 3,842,238 | 10/1974 | Boyko et al. | 376/451 |
| 4,003,788 | 1/1977 | Boyko et al. | 376/451 |
| 4,142,645 | 3/1979 | Walton | 137/526 |
| 4,188,521 | 2/1980 | Yeo | 219/60 A |
| 4,253,524 | 3/1981 | Erickson | 137/533.11 |
| 4,387,736 | 6/1983 | Major | 137/550 |
| 4,480,171 | 10/1984 | Christiansen et al. | 219/136 |
| 4,570,051 | 2/1986 | Miwa | 376/451 |
| 4,837,419 | 6/1989 | Boatwright et al. | 219/60 R |
| 4,857,691 | 8/1989 | Boatwright | 219/60 R |

FOREIGN PATENT DOCUMENTS

| | | |
|---|---|---|
| 17862 | 4/1928 | Netherlands . |
| 411323 | 8/1933 | United Kingdom . |
| 1000067 | 3/1963 | United Kingdom . |

Primary Examiner—Daniel D. Wasil

[57] ABSTRACT

An end stop is adapted for engaging the sealing plug positioned in the end of a nuclear fuel rod and so as to permit the evacuation of the fuel rod to facilitate girth welding of the plug onto the rod, and to permit pressurization of the fuel rod and an enclosing welding chamber to facilitate the seal welding closure of the axial opening in the end stop. The end stop includes an axial passage extending therethrough having a welding electrode coaxially positioned therein to facilitate the seal welding closure of the fuel rod sealing plug. An air channel extends between the axial passage and an outlet on the surface of the end stop. A one-way valve is positioned in the air channel for permitting the free passage of a gas from the axial passage to the outlet into the welding chamber while precluding passage of a gas in the reverse direction.

9 Claims, 2 Drawing Sheets

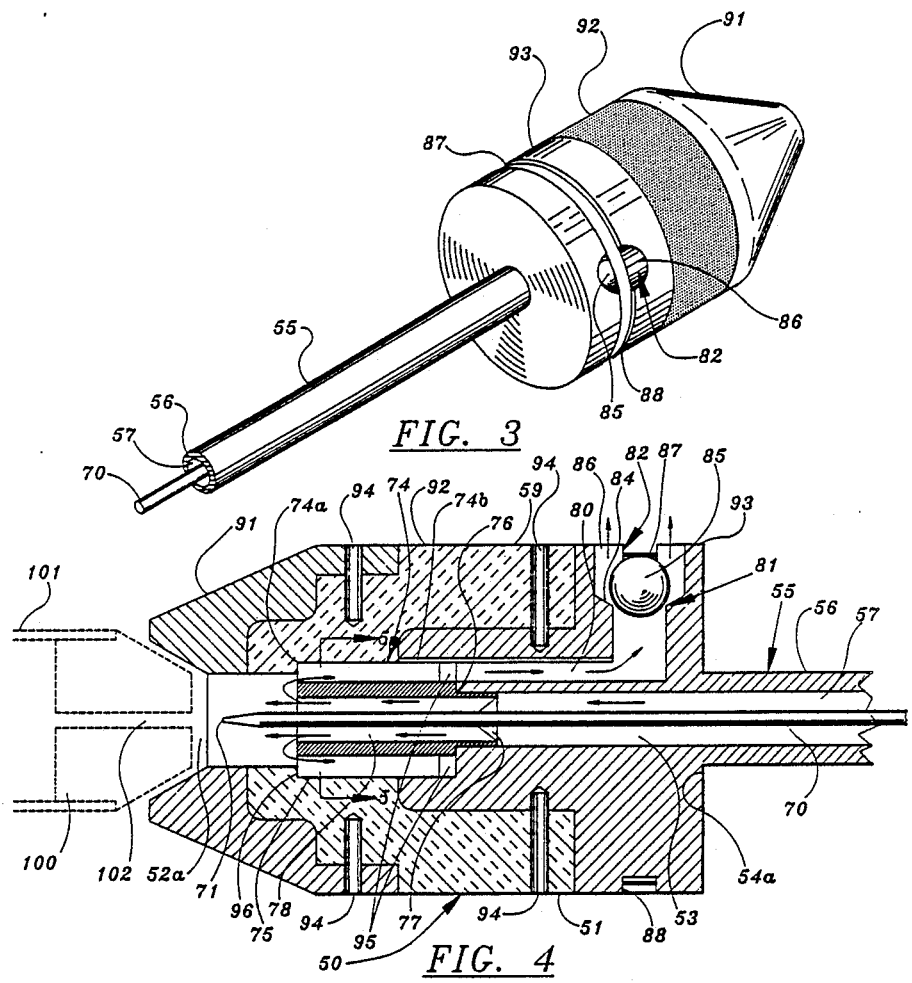
FIG. 3
FIG. 4
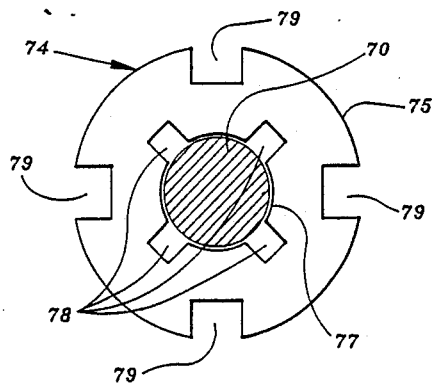
FIG. 5

END STOP FOR WELDING SEALING PLUGS OF NUCLEAR FUEL RODS

CROSS REFERENCE TO RELATED APPLICATIONS

Reference is hereby made to the following copending applications dealing with related subject matter and assigned to the assignee of the present invention:

1. "Fuel Rod End Plug Welding Apparatus and Method," by Boatwright et al, assigned U.S. Ser. No. 201,145 and filed June 2, 1988, now U.S. Pat. No. 4,837,419. (W.E. Case 54,382).

2. "Burnable Absorber Rod End Plug Welding Apparatus" by Boatwright, assigned U.S. Ser. No. 201,224 and filed June 2, 1988; now U.S. Pat. No. 4,857,691. (W.E. Case No. 54,383).

FIELD OF THE INVENTION

This invention relates to an end stop adapted for engaging and welding the sealing plugs of nuclear fuel rods and more particularly to an end stop adapted for engaging the sealing plugs of nuclear fuel rods and which permits the evacuation and pressurization of fuel rods to facilitate girth and seal welding of the plugs.

BACKGROUND OF THE INVENTION

Nuclear fuel rods are manufactured from open-ended zirconium alloy tubular rods. One end of the rod is plugged with a zirconium alloy end plug and girth welded. Fissionable pellets are inserted into the rod, and the rod is then plugged at its open end with a conventional zirconium alloy sealing plug having a small axial opening therein for allowing gas flow in and out of the rod.

In prior art practices, the rod is transferred to a girth welding chamber where the rod is advanced against an end stop. The end stop serves two functions. It positions the fuel rod and permits evacuation of the rod for subsequent girth welding. The end stop typically includes an axial opening therethrough which communicates with the interior of the fuel rod. A vacuum is drawn through the end stop to evacuate the fuel rod to prevent oxidation when girth welding. Additionally, the end stop is fixed on bearings allowing slow rotation of the fuel rod and end stop as one unit. A tungsten inert gas welder is positioned adjacent the end stop, and as the rod rotates, the tungsten inert gas welder fuses the end plug into the fuel rod by welding the periphery of the rod end.

In accordance with prior art practices, after the fuel rod is girth welded, it is transferred to a seal weld chamber. The chamber is pressurized to approximately 600 psi with an inert gas such as argon, helium or a helium-argon mixture. As the chamber is pressurized, the fuel rod is pressurized at an equal rate through the sealing plug axial opening. When the pressure in the fuel rod is equal to chamber pressure, a welding electrode end stop is advanced adjacent and coaxial with the axial opening and an arc is discharged from the electrode to the axial opening to fuse the opening closed. Because welding is conducted in an inert gas atmosphere, oxidation and other undesirable material affects are minimized. Additionally, the fuel rod has been pressurized with an inert gas. The high pressure in the fuel rod minimizes the possibility that the rod will collapse under the high pressures attendant a nuclear reactor core. The inert gas in the rod also minimizes internal oxidation of the fuel rod.

The above described prior art practice is limited because it is expensive and cumbersome. Two separate welding chambers are used. The first chamber is evacuated for girth welding and the second chamber is pressurized. Each chamber requires separate controls and rod handling means. Different designs in end stops also are required: one for the girth welding chamber and one for the seal weld chamber, resulting in increased tooling and production costs. Additionally, the rod must be handled between the girth and seal welding operations resulting in increased handling costs. In related U.S. Pat. No. 4,837,419, both girth and seal welds are made in a single chamber, where an end stop is adapted to fill both the welding chamber and fuel rod with a gas. However, the disclosed end stop is not adapted for efficient evacuation of the fuel rod and pressurization of both the fuel rod and the welding chamber.

Therefore, it is an object of this invention to provide an apparatus wherein girth and seal welding of a sealing plug coaxially positioned in the end of a nuclear fuel rod are performed in one weld chamber.

It is another object of this invention to provide an end stop adapted for engaging a sealing plug coaxially positioned in the end of a nuclear fuel rod where the end stop permits the evacuation of the fuel rod to facilitate the girth welding of the plug into the rod, and also permits pressurization of the fuel rod and an enclosing welding chamber to facilitate the seal welding closure of the axial opening in the plug.

SUMMARY OF THE INVENTION

These and other objects and advantages of the present invention are accomplished by an end stop adapted for engaging a sealing plug which is coaxially positioned in the end of a nuclear fuel rod. The sealing plug has an axial opening therethrough which communicates with the interior of the fuel rod. The end stop is characterized by the ability to permit the evacuation of the fuel rod to facilitate the girth welding of the plug onto the rod, and also to permit pressurization of the fuel rod and an enclosing welding chamber to facilitate the seal welding closure of the axial opening in the plug.

The end stop includes a body member having front and rear ends, an outer peripheral surface, and an axial passage extending through the body member from the front end to the rear end to form front and rear openings. The front opening is configured to engage the end of a fuel rod sealing plug so that the axial opening of the plug communicates with the axial passage of the body member. Means communicates with the rear opening of the body member for permitting selective connection thereof to a vacuum source or a pressurized gas source. An air channel in the body member extends between the axial passage and an outlet at the outer peripheral surface. A one-way valve positioned in the air channel permits the free passage of a gas from the axial passage to the outlet while precluding passage in the reverse direction. A welding electrode extends coaxially through the axial passage and includes a forward end positioned adjacent the front opening of the body member for permitting the seal welding closure of the axial opening in a fuel rod sealing plug engaging the front opening of the body member.

In the preferred embodiment, the end stop body member includes a front portion, a rear portion, and an intermediate portion disposed between the front and rear portions. The intermediate portion is composed of an electrical insulator so as to electrically isolate the front and rear portions.

BRIEF DESCRIPTION OF THE DRAWINGS

Some of the objects and advantages of the present invention having been stated, others will be more fully understood from the detailed description which follows and by reference to the accompanying drawings in which:

FIG. 3 is an isometric view of the end stop in accordance with the present invention.

FIG. 4 is an enlarged sectional view of the end stop of FIG. 1 showing in detail the welding electrode, air channel and spheroidal ball positioned therein.

FIG. 5 is a sectional view taken along Line 5—5 of FIG. 4 showing in detail the configuration of the welding electrode support member.

DETAILED DESCRIPTION OF THE PREFERRED EMBODIMENT

Figure 1:
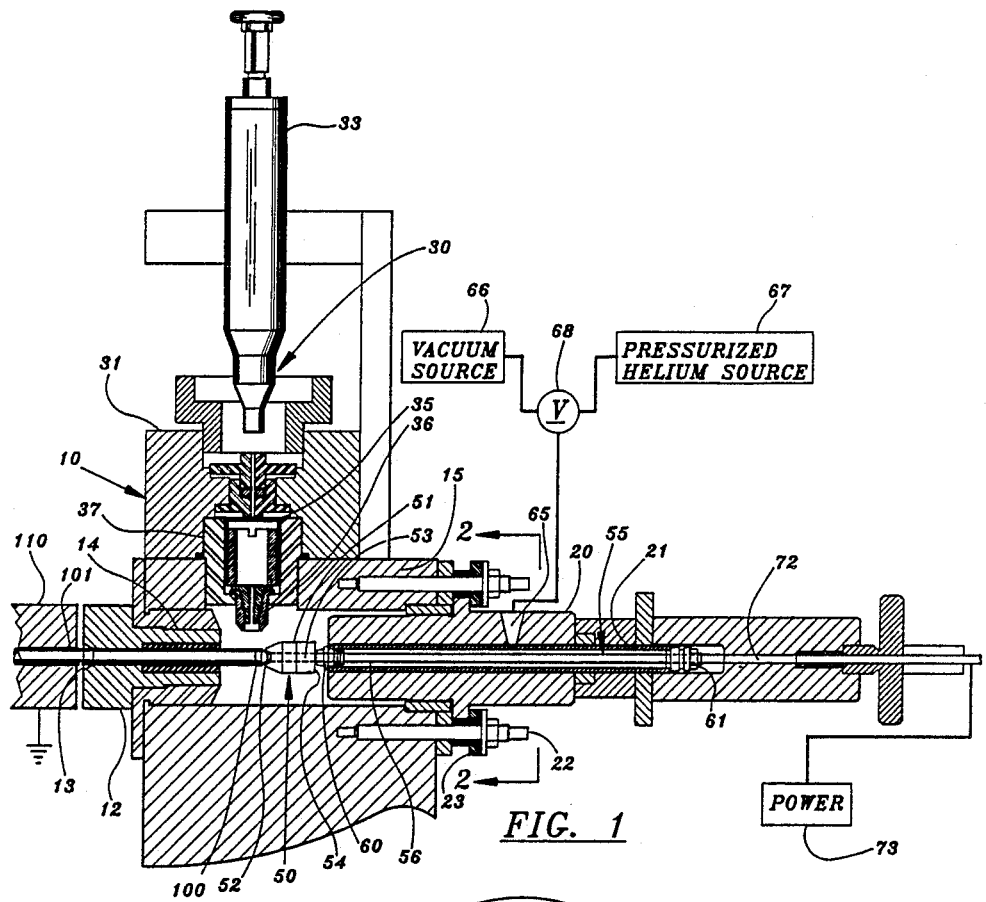
FIG. 1 is a partial side-sectional view showing in section the welding chamber having the end stop in accordance with the present invention engaged with the end of a fuel rod sealing plug.
Figure 2:
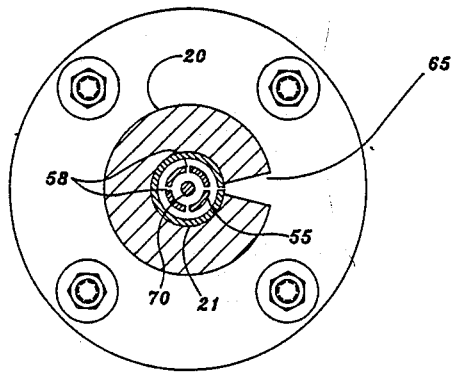
FIG. 2 is a sectional view taken along line 2—2 of FIG. 1 showing the gas passage nozzle and radially extending orifices in the gas passage tube of the end stop.

Referring to the drawings, and more particularly to FIG. 1, there is shown a conventional welding chamber 10 for girth welding a zirconium sealing plug 100 coaxially positioned in the end of a zirconium nuclear fuel rod 101. The welding chamber 10 has been modified to include the improved end stop 50 of the present invention which permits the evacuation of the fuel rod 101 to facilitate the girth welding of the sealing plug 100 onto the fuel rod and the pressurization of the fuel rod and welding chamber 10 to facilitate the seal welding closure of a sealing plug axial opening 102 (FIG. 3). The axial opening 102 allows evacuation or pressurization of the fuel rod 101 by permitting the passage of a high pressure gas therethrough.

As is conventional, the welding chamber 10 includes a fuel rod receiving head 12 having an orifice 13 therethrough to receive a nuclear fuel rod. The receiving head 12 is secured by a press fit into a welding chamber access opening 14. The fuel rod 101, held by a chuck 110, is advanced through the receiving head 12 so that the sealing plug 100 engages the end stop 50. As will be explained in detail later, the end stop 50 is rotatably mounted by a frictionless bearing 60 to an end stop support column 20 which is bolted to the welding chamber housing 15 by means of bolts 22 and spacer bushings 23, to allow unimpeded rotation of the fuel rod 101 during girth welding.

A conventional girth welding apparatus 30 is supported by a coupler assembly 31 fixed to the welding chamber housing 15 and extends radially into the welding chamber 10. The girth welding apparatus 30 is a conventional TIG welder and includes a power generator 33 having an electrode (not shown) therein, and a welding nozzle 35 for mixing an inert gas with the arc produced by the power generator. The welding nozzle terminates in a tip 36 positioned adjacent the fuel rod sealing plug 100. As illustrated, a housing 37 supports the nozzle 35 and tip 36 in position. As the fuel rod 101 rotates, the generated arc jumps the gap between the nozzle tip 36 and sealing plug 100 creating heat at the sealing plug to fuse the sealing plug 100 to the fuel rod 101.

The conventional TIG welding practice inherently minimizes some oxidation around the perimeter of the fuel rod 101. However, unless the fuel rod 101 is evacuated, oxidation may occur inside the fuel rod 101 during welding by the high heat generated therein. In all conventional prior art practices, the fuel rod 101 is evacuated before girth welding to minimize internal rod oxidation. As is conventional, the end stop 50 includes a main body member 51 having a front end 52 configured to engage the end of a fuel rod sealing plug 100 in a vacuum tight seal. The sealing plug axial opening 102 communicates with the interior of the fuel rod and also with an axial passage 53 extending through the end plug 50 from the front end 52 to the rear end 54 and forming respective front and rear openings thereat 52a, 54a (FIG. 4). A gas passage tube 55 of rigid stainless steel construction and having an outer wall 56 and internal passage 57 is connected to the rear of the end stop body 51 so that the gas passage tube internal passage 57 communicates with the rear opening of the axial passage 53 in the body 51. As illustrated, the tube 55 extends rearwardly and coaxially through a support tube 21 which is disposed in an axial passage formed in the end stop support column 20. The tube 55 is rotatably supported therein by a conventional ball thrust bearing and radial ball bearing 60, which allow rotation of the end stop 50. The gas passage tube 55 extends through the support tube and engages conventional seal housing and O-ring 61.

A gas passage nozzle 65 extends radially through the support column and tube 21 at a location between the first and second bearing supports 60, 61. The gas passage tube 55 includes four orifices 58 extending radially through the outer wall 56 and communicating with the axial passage between the tube 21 and tube 55. The nozzle 65 communicates through a conventional valve 86 to a vacuum source 66 which creates a vacuum draw allowing evacuation of the support tube 21 and the gas passage tube 55 via the orifices 58. Gas is thereby drawn from the fuel rod 101 through the axial passage 53 of the end stop body 51 into the gas passage tube 55 and through the orifices 58. Typically, a vacuum of 27 or 28 inches of mercury is drawn to provide enough reduced atmosphere within the fuel rod 101 to minimize oxidation therein. After evacuation the fuel rod 101 is girth welded.

During girth welding, the fuel rod 101 continually engages the end stop 50 to maintain the proper arc distance between the fuel rod sealing plug 100 and the welding nozzle tip 36. The chuck 110 drivingly engages the fuel rod 101 to rotate it and the end stop rotatably supported on the bearing 60, as one unit to allow full circumferential welding of the fuel rod 101. Typically, the girth weld operation takes six seconds and can be either pulse or non-pulse welding using normal welding parameters.

In prior act practices, when the girth weld was completed, a fuel rod was removed from the welding chamber and transferred to a second pressurized seal welding chamber. The fuel rod was pressurized through the axial opening in the sealing plug and seal welded, fusing the axial opening in the sealing plug to prevent depressurization thereat.

The end stop 50 in accordance with the present invention allows both girth and seal welding in the same welding chamber such as illustrated in FIG. 1. The end stop 50 is characterized by the ability to permit the evacuation of the fuel rod 101 to facilitate the girth welding of the plug onto the fuel rod 101, and also to permit pressurization of the fuel rod and the enclosing welding chamber 10 to facilitate the seal welding closure of the axial opening 102 in the fuel rod sealing plug 100.

Referring now more particularly to FIGS. 3 and 4, and as will be explained in more detail later, the end stop 50 includes a welding electrode 70 extending coaxially through the axial passage 53 of the body 51. The welding electrode 70 includes a forward end 71 positioned adjacent the front opening 52a of the body 51 so that a gap of typically about 0.020 inches (0.5 millimeters) is formed between the electrode 70 and the fuel rod sealing plug 100 positioned against the end stop 50. An arc discharged across the gap from the electrode 70 to the sealing plug 100 welds the sealing plug axial opening 102 closed to prevent depressurization of the fuel rod 101 after having been pressurized. An air channel 80, having a one-way valve 81 positioned therein, extends between the axial passage 53 and an outlet 82 at the outer peripheral surface 59 of the body 51. The one-way valve 81 permits the free passage of a gas from the axial passage 53 to the outlet 82 while precluding passage of gas in the reverse direction.

A pressurized helium source 67 connects to the multiple path gate valve 68. The gate valve 68 thus selectively interconnects the vacuum source 66 and the gas passage nozzle 65. In operation, the fuel rod 101 is evacuated and then girth welded. The one-way valve 81 positioned in the air channel 80 prevents any loss of vacuum draw from the fuel rod 101 because gas present in the welding chamber 10 is not evacuated through the end stop 50. Thus, a full vacuum draw is assured. After the fuel rod 101 is girth welded, the multiple path gate valve 68 is adjusted to close-off the vacuum source 66 and open the pressurized helium source 67. The high pressure helium flows at up to 600 psi and flows into the fuel rod 101, cooling the welding electrode 70 and sealing plug 100 as the high pressure helium passes therethrough. The high pressure helium also forces any vapors formed during girth welding from the fuel rod 101. Additionally, the helium flows through the air channel 80 and one-way valve 81 pressurizing the welding chamber 10 at a pressure equal to rod pressure. After pressurization, a current of typically about 40 amps is passed through the electrode 70 generating an arc between the electrode 70 and the sealing plug 100, welding the sealing plug axial opening 102 closed. Oxidation is minimized during welding by the high pressure helium gas which also cools the electrode 70 after each weld cycle allowing faster cycle times between welds. After pressurization and welding, the fuel rod 101 is removed and replaced by another fuel rod and the cycle is repeated.

Referring now more particularly to FIG. 4, the end stop body 50 includes a front portion 91, a rear portion 93, and an intermediate portion 92 disposed between the front and rear portions 91, 93. The front portion 91 is machined from high speed steel to withstand wear generated by the repeated engagement of zirconium alloy fuel rod sealing plugs against the body 51. The rear portion 93 is formed from a stainless or other high alloy steel. The intermediate portion 92 is composed of a machinable ceramic and electrically isolates respective front and rear portions 91, 93 to prevent arcing between the electrode 70 and the metallic front portion 91. Pins 94 interconnect the front, intermediate and rear portions 91, 92, 93 to maintain these portions together as an integral body 51.

As illustrated in FIG. 4, the air channel 80 is machined in the rear portion 93 of the body 51 and is countersunk at the outlet 82 to form an inwardly tapered air channel portion 84 or "valve seat" thereat. A spheroidal ball 85 is positioned in the air channel 80 and dimensioned to fit within the countersink 86 at the outlet 80 and retain an allowance between the ball 85 and walls of the countersink 86. The spheroidal ball 85 is retained in the countersink 86 by a circumferential retaining clip 87 positioned in a retaining groove 88 machined on the outer peripheral surface 59 of the body 51. When a high pressure gas is passed through the axial passage 53, the spheroidal ball 85 is forced upwardly against the retaining clip 87 allowing passage of the high pressure gas around the ball 85 and through the outlet 82. During fuel rod evacuation, the higher welding chamber pressure forces the spheroidal ball 85 against the valve seat 84. The ball 85 is dimensioned to engage the valve seat 84 without passing therethrough, and thus prevent the passage of a gas from the outlet 82 into the body axial passage 53 when the fuel rod 101 and axial passage are evacuated.

Referring again to the details of the welding chamber 10 illustrated in FIG. 1, the electrode 70 extends the length of the gas passage tube 55. Electrical conduit means 72 connects the electrode at the seal housing 61 to a conventional power supply 73 which provides to the electrode 70 the required 40 amps used in welding. An electrode support member 74 is frictionally retained in the axial passage 53 and engages the electrode 70 to position it in a fixed coaxial relation with the axial passage of the body 51. The welding electrode support member 74 has front and rear ends 74a, 74b and an outer, substantially circular peripheral surface 75 (FIG. 5). The support member 74 is positioned in the axial passage 53 of the body 51 and engages the intermediate and rear portions of the body 92, 93. The support member front end 74a is retained against a support stop 96 formed in the axial passage 53 of the ceramic intermediate portion 92. The support member rear end 74b includes a stepped portion forming a ledge 76 thereat for engagement with the metallic rear portion 93. The support stop 96 and the ledge 76, engaging the rear portion 93, maintain the support member 74 in fixed relation to the axial passage 53.

As illustrated, a drilled opening 77 extends through the support member coaxial with the axial passage of the body. The welding electrode 70 is frictionally received into the opening 77 so that its forward end 71 is positioned adjacent the front opening 52a of the body member. The interference fit between the electrode 70 and drilled opening 77 provides the desired rigidity to the electrode 70 to maintain the electrode in a fixed, coaxial relation with the axial passage 57. Four equally spaced inner slots 78 extend along the support member drilled opening 77 (FIGS. 4 and 5) from the front 74a to rear ends 74b thereof. The slots 78 provide open areas through which a gas can flow therethrough for enabling the evacuation and pressurization of a fuel rod. Although the slots 78 are rectangularly configured and produced by conventional machining or electrical discharge methods, almost any slot configuration can be used as long as sufficient open area is provided for the passage of a gas therethrough.

Four equally spaced outer channels 79 extend along the outer peripheral surface 75 of the support member 74 from the front 74a to rear end 74b thereof (FIGS. 4 and 5). The channels 79 are machined at radial positions at an acute angle with the inner slots 78 (FIG. 5) to maintain the structural integrity of the support member 74. The four outer channels 79 terminate at the rear end 74b of the support member 74 in a peripheral groove machined on the support member peripheral surface 75, forming a concentric channel 95 between the support member 74 and the rear portion 93 of the body 51 (FIG. 4). As illustrated, the concentric channel 95 communicates with the air channel 80 machined in the rear portion 93 of the body. Thus, an unopposed open gas flow channel is formed between the axial passage 53, the fuel rod 101 and the air channel 80 machined in the body rear portion 93.

At the start of the welding operation, the fuel rod 101 initially is evacuated by drawing gas from the fuel rod, through the support member inner slots 78 and into the gas passage tube 55. The spheroidal ball 85 is drawn onto the valve seat 84 closing the air channel 80 and preventing any gas from being drawn from the welding chamber 10 and through the air channel outlet 82 and air channel 80. From the gas passage tube 55, the gas is drawn through the orifices 58 and into the gas passage nozzle 65. When evacuation of the fuel rod 101 is complete, the rod is girth welded.

After girth welding, a high pressure helium gas of approximately 600 psi (3700 KPa) is forced through the body axial passage 53 to pressurize the fuel rod 101. The high pressure helium gas initially flows through the inner slots 78 and into the fuel rod. As the fuel rod is pressurized, the helium gas forces weld vapors formed during the girth welding operation out of the rod. The high pressure helium gas and weld vapors are forced through the outer channels 78 and into the air channel 80. The high pressure helium raises the spheroidal ball 85 off the valve seat 84 allowing the gas to pass therethrough to pressurize the welding chamber 10 and purge the end stop of weld vapors. The pressure needed to raise the spheroidal ball 85 off the valve seat 84 can be adjusted by varying the spring strength of the retaining clip 87.

Once the fuel rod 101 and welding chamber 10 are stabilized at similar high pressures, the fuel rod is seal welded by passing an electric arc from the electrode 70 to the fuel rod sealing plug 100 to fuse the sealing plug axial opening 102 closed. The high pressure helium gas minimizes oxidation during welding and provides the internal high pressure needed in a fuel rod to prevent collapse thereof under the high pressures in a nuclear fuel reactor core vessel.

The foregoing embodiment is to be considered illustrative, rather than restrictive of the invention and the modifications which come whether the meaning and range of equivalent of the claims are to be included therein.

That which is claimed is:

1. An end stop adapted for engaging a sealing plug which is coaxially positioned in the end of a nuclear fuel rod and which has an axial opening therethrough which communicates with the interior of the fuel rod, said end stop being characterized by the ability to permit the evacuation of the fuel rod to facilitate the girth welding of the plug onto the rod, and also to permit pressurization of the fuel rod and an enclosing welding chamber to facilitate the seal welding closure of the axial opening in the plug, and comprising a body member comprising front and rear ends, an outer peripheral surface, and an axial passage extending through said body member from said front end to said rear end to form front and rear openings, said front opening being configured to engage the end of a fuel rod sealing plug and so that the axial opening of the plug communicates with the axial passage of said body member, means communicating with the rear opening of said body member for permitting selective connection thereof to a vacuum source or a pressurized gas source, air channel means in said body member and extending between said axial passage and an outlet at said outer peripheral surface, one-way valve means positioned in said air channel means for permitting the free passage of a gas from said axial passage to said outlet while precluding passage in the reverse direction, and welding electrode means extending coaxially through said axial passage and including a forward end positioned adjacent said front opening of said body member for permitting the seal welding closure of the axial opening in a fuel rod sealing plug engaging said front opening of said body member.

2. The end stop as defined in claim 1 wherein said body member comprises a front portion, a rear portion, and an intermediate portion disposed between said front and rear portions and being composed of an electrical insulator so as to electrically isolate said front and rear portions.

3. The end stop as defined in claim 1 wherein said valve means positioned in said air channel means includes a countersink at said outlet, a ball positioned in said countersink, and spring retaining means engaging said outer peripheral surface and said ball for retaining said spheroidal ball inside said countersink.

4. The end stop as defined in claim 3 wherein said countersink includes an inwardly tapered portion extending toward said axial passage to form a valve seat thereat, with said ball being dimensioned to cooperate with said tapered valve seat to preclude the passage of a gas from the outlet into the axial passage.

5. The end stop as defined in claim 1 wherein said means communicating with the rear opening of said body member includes a tubular member having an outer wall and an internal passage communicating with the axial passage of said body member, and at least one orifice extending radially through said outer wall of said tubular member for communicating with a vacuum or pressurized gas source.

6. The end stop as defined in claim 1 wherein said front opening is tapered so as to be adapted to engage the end of a fuel rod sealing plug in a vacuum tight seal.

7. An end stop adapted for engaging a sealing plug which is coaxially positioned in the end of a nuclear fuel rod and which has an axial opening therethrough which communicates with the interior of the fuel rod, said end stop being characterized by the ability to permit the evacuation of the fuel rod to facilitate the girth welding of the plug onto the rod, and also to permit pressurization of the fuel rod and an enclosing welding chamber to facilitate the seal welding closure of the axial opening in the plug, and comprising a body member comprising front and rear ends, an outer peripheral surface, and an axial passage extending through said body member from said front end to said rear end to form front and rear openings, said front opening being configured to engage the end of a fuel rod sealing plug and so that the axial opening of the plug communicates with the axial passage of said body member, means communicating with the rear opening of said body member for permitting selective connection thereof to a vacuum source or a pressurized gas source, air channel means in said body member and extending between said axial passage and an outlet at said outer peripheral surface, one-way valve means positioned in said air channel means for permitting the free passage of a gas from said axial passage to said outlet while precluding passage in the reverse direction, and welding electrode means extending coaxially through said axial passage for permitting the seal welding closure of the axial opening in a fuel rod sealing plug engaging said front opening of said body, said welding electrode means comprising a support member positioned within said axial passage and having front and rear ends, an outer peripheral surface frictionally engaging said body member within said axial passage, an inner opening extending therethrough and coaxial with said axial passage, and a welding electrode extending coaxially through said inner opening and being frictionally engaged thereby, said electrode including a forward end positioned adjacent said front opening of said body member, said inner opening of said support member including slot means to allow the passage of a gas therethrough.

8. The end stop as defined in claim 7 wherein said slot means includes at least one inner slot extending axially along said inner opening, and said air channel means includes at least one outer channel extending axially along said outer peripheral surface of said support member.

9. The end stop as defined in claim 7 wherein said body member comprises a front portion, a rear portion, and an intermediate portion disposed between said front and rear portions and being composed of an electrical insulator so as to electrically isolate said front and rear portions, said support member being frictionally retained within said axial passage by said intermediate and rear portions.

* * * * *